US008297387B2

(12) United States Patent
Kadoi et al.

(10) Patent No.: US 8,297,387 B2
(45) Date of Patent: Oct. 30, 2012

(54) ELECTRIC VEHICLE

(75) Inventors: Masaru Kadoi, Anjyo (JP); Yoshiaki Hujita, Okazaki (JP)

(73) Assignees: Mitsubishi Jidosha Kabushiki Kaisha, Tokyo (JP); Mitsubishi Jidosha Engineering Kabushiki Kaish, Okazaki (JP)

( * ) Notice: Subject to any disclaimer, the term of this patent is extended or adjusted under 35 U.S.C. 154(b) by 411 days.

(21) Appl. No.: 12/445,414

(22) PCT Filed: Mar. 14, 2008

(86) PCT No.: PCT/JP2008/055187
§ 371 (c)(1),
(2), (4) Date: Jun. 15, 2009

(87) PCT Pub. No.: WO2009/041092
PCT Pub. Date: Apr. 2, 2009

(65) Prior Publication Data
US 2010/0116568 A1 May 13, 2010

(30) Foreign Application Priority Data
Sep. 28, 2007 (JP) ................................ 2007-256474

(51) Int. Cl.
*B60K 1/00* (2006.01)
(52) U.S. Cl. ...................... 180/65.1; 180/68.5; 180/68.1
(58) Field of Classification Search .................. 180/68.5, 180/68.1, 68.2, 68.3, 65.31, 65.1; 429/88, 429/120, 148
See application file for complete search history.

(56) References Cited

U.S. PATENT DOCUMENTS

| 4,135,593 | A  | * | 1/1979  | Fowkes ......................... 180/68.5 |
| 5,392,873 | A  | * | 2/1995  | Masuyama et al. .......... 180/68.5 |
| 5,490,572 | A  |   | 2/1996  | Tajiri et al. |
| 6,094,927 | A  | * | 8/2000  | Anazawa et al. ............... 62/239 |
| 6,220,383 | B1 | * | 4/2001  | Muraki et al. ............... 180/68.5 |
| 6,315,069 | B1 | * | 11/2001 | Suba et al. .................... 180/68.5 |
| 6,569,556 | B2 | * | 5/2003  | Zhou et al. ....................... 429/88 |
| 6,631,775 | B1 | * | 10/2003 | Chaney ......................... 180/68.5 |
| 6,662,891 | B2 | * | 12/2003 | Misu et al. .................... 180/68.1 |
| 6,978,855 | B2 | * | 12/2005 | Kubota et al. ................ 180/68.2 |
| 7,240,752 | B2 | * | 7/2007  | Takahashi et al. ........... 180/68.1 |
| 7,353,900 | B2 | * | 4/2008  | Abe et al. ..................... 180/68.5 |
| 7,451,608 | B2 | * | 11/2008 | Kikuchi .......................... 62/186 |
| 7,642,002 | B2 | * | 1/2010  | Hamery et al. ............... 180/68.1 |
| 7,900,727 | B2 | * | 3/2011  | Shinmura .................... 180/68.1 |

FOREIGN PATENT DOCUMENTS

| JP | 5-169981   | A  | 7/1993  |
| JP | 5-262144   | A  | 10/1993 |
| JP | 3050051    | B2 | 3/2000  |
| JP | 2005-238941| A  | 9/2005  |
| JP | 2006-168681| A  | 6/2006  |
| JP | 2006-188209| A  | 7/2006  |

* cited by examiner

*Primary Examiner* — Hau Phan
(74) *Attorney, Agent, or Firm* — Birch, Stewart, Kolasch & Birch, LLP

(57) ABSTRACT

An electric vehicle which can cool a power unit by cold airstreams without causing dew drops and a temperature rise in a vehicle interior is provided. The electric vehicle travels by operating a motor, and includes a duct having one end joined to the air conditioning unit and the other end joined to the power unit and serving as an airstream flow path via which cold airstreams are guided from an air conditioning unit to the power unit. The duct is shaped in accordance with a shape of a vehicle interior near a front passenger's seat, and being positioned under a floor at the front passenger's seat.

8 Claims, 4 Drawing Sheets

ELECTRIC VEHICLE

FIELD OF THE INVENTION

The present invention relates to an electric vehicle in which a battery unit serving as a power unit for a motor is cooled by cool airstreams from an air conditioner, and more particularly relates to a duct which introduces cold airstreams to the power unit.

BACKGROUND OF THE INVENTION

Generally, an electric vehicle travels by operating a motor, and is provided with a massive battery unit serving as a power unit for the motor. The battery unit is subject to a temperature rise when it is charged or discharged. When heated above a proper temperature, the battery unit worsens its performance and is quickly aged. Patent Publication No. 3050051 has proposed to introduce cold airstreams from an air conditioning unit of an electric vehicle to a power unit via a duct and to cool a battery unit.

SUMMARY OF THE INVENTION

Problems to be Solved by the Invention

It is preferable that a duct is positioned to linearly connect an outlet of an air conditioning unit and a power unit so that cold airstreams can be introduced to the power unit. This arrangement is effective in decreasing loss of cold airstreams due to flow resistance. However, the duct has to be positioned in a vehicle interior, which will reduce a passenger space and interior comfort. The exposed duct may make the vehicle interior less attractive. Further, dew drops will be generated on the duct due to a temperature difference between the vehicle interior and the cold airstreams, and will fall on passengers. Further, cold airstreams may be heated by air in the vehicle. The foregoing reference describes that cold airstreams are guided from the air conditioning unit to the power unit via the duct. However, the cited invention does not seem to pay attention to a problem that dew drops, a temperature rise or decreased interior comfort is caused while cold airstreams are guided.

The invention is intended to provide an electric vehicle which can cool a power unit by suppressing dew drops and a temperature rise while introducing cold airstreams to a power unit.

Means to Solve the Problems

To solve the foregoing problems, in a first aspect of the present invention, an electric vehicle which travels by operating a motor and in which a power unit for the motor is cooled by cold airstreams from an air conditioning unit. The electric vehicle includes a duct having one end joined to the air conditioning unit and the other end joined to the power unit and serving as an airstream flow path via which cold airstreams are guided from the air conditioning unit to the power unit. The duct is shaped in accordance with a shape of a vehicle interior near a front passenger's seat, and being positioned under a floor at the front passenger's seat.

In the electric vehicle, the duct is joined to the power unit at a position which is higher than a lowest position thereof.

In the electric vehicle, the duct has a plurality of ribs near the floor, the ribs dividing the airstream flow path.

In the electric vehicle according to the second aspect of the invention, the duct has a plurality of ribs near the floor, the ribs dividing the air flow path.

In the electric vehicle according to the first aspect of the invention, the duct is housed in a space defined by a bulk material, the floor and a carpet on the floor.

In the electric vehicle according to the second aspect of the invention, the duct is housed in a space defined by a bulk material, the floor and a carpet on the floor.

Finally, in the electric vehicle according to a third aspect of the invention, the duct is housed in a space defined by a bulk material, the floor and a carpet on the floor.

Effects of the Invention

According to the invention, the electric vehicle includes the duct, which is connected to the air conditioning unit at one end and to the power unit for the motor at the other end. The duct is shaped in accordance with a shape of the floor at the front passenger's seat, and is positioned under the floor, so that cold airstreams can be guided to the power unit without adversely affecting the interior comfort of the electric vehicle. The front passenger's seat is not always occupied by a passenger.

Further, the end of the duct connected to the power unit is positioned higher than its lowest position, which is effective in preventing water, which comes into the duct, from flowing into the battery unit container, and protecting the battery unit 5.

Still further, the ribs at the center of the duct can reinforce the center, so that the duct is slow to be deformed, can reliably guide a necessary amount of cold airstreams, and can remain strong.

The duct is positioned in the space defined by the floor and the floor carpet which are maintained by the bulk material, remains invisible in the vehicle interior, and protects the front seat passenger against dew drops. Further, the space serves as a heat insulator, prevents cold airstreams from being heated by air in the vehicle interior, and maintains a temperature of cold airstreams at an optimum level. The floor where the duct is positioned can be kept substantially flat, which is effective in improving the interior comfort of the vehicle.

Figure 1:
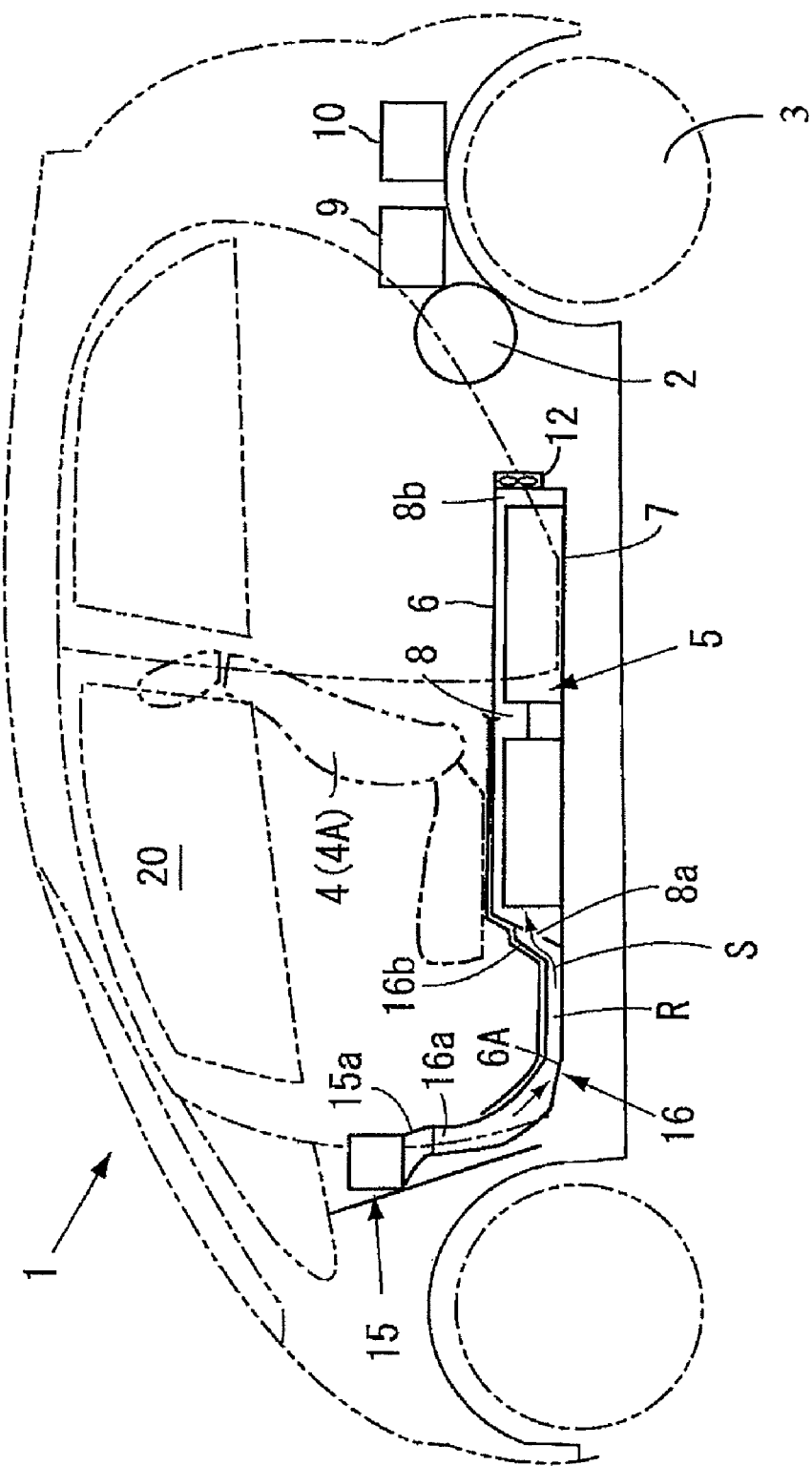
FIG. 1 is a schematic view of an electric vehicle according to an embodiment of the invention.

REFERENCE NUMERALS 1 electric vehicle
2 motor
4A front passenger's seat
5 power source (battery unit)
6A front passenger's seat floor
15 air conditioning unit
15a outlet of air conditioning unit
16 duct 16a front end of duct
16b rear end of duct
16h rear end opening connecting to power unit
16g bottom of duct (positioned on vehicle floor)
18a, 18b ribs
20 vehicle interior
21 bulk material
22 space
23 floor carpet
R flow path
S cold airstreams

DETAILED DESCRIPTION OF THE INVENTION

According to the invention, a power unit is cooled by airstreams which are introduced via a duct, of which shape is modified in order to prevent dew drops and a temperature rise in a passenger room and improve occupant comfort while airstreams are being guided to the power unit.

The invention will be described with reference to an embodiment shown in the drawings.

An electric vehicle 1 shown in FIG. 1 travels by rotating wheels 3 which are driven by a motor 2. A battery unit 5 serves as a power source for the motor 2, and is located under a driver's seat 4 (or a front passenger's seat 4A). The battery unit 5 is constituted by a plurality of battery modules (called a battery pack), each of which includes a plurality of battery cells. Further, the battery unit 5 is housed in a battery unit container 8 defined by a floor panel 6 and a shield plate 7 under the floor panel 6. A recharger 9 and an inverter 10 are connected to the battery unit 5. The electric vehicle 1 is provided with a well-known air conditioning unit 15 which controls a temperature and humidity in a vehicle interior 20.

The battery unit container 8 has an air inlet 8a at its front side and a discharge spout 8b at its rear side. An exhaust fan 12 is positioned at the discharge spout 8b, and attracts airstreams in the battery unit container 8 and discharges them to the exterior when operated.

A duct 16 extends between the air conditioning unit 15 and the battery unit container 8, and serves as an air flow path R, via which cold airstreams S are guided to the battery unit container 8 from the air conditioning unit 15. Specifically, the duct 16 has its front end 16a connected to an outlet 15a of the air conditioning unit 15, and its rear end 16b connected to the air inlet 8a of the battery unit container 8. The battery unit 5 is cooled by cold airstreams guided via the duct 16. The duct 16 is positioned on a vehicle floor 6A in front of the front passenger's seat 4A, and is shaped in conformity to the vehicle floor 6A.

Figure 2:
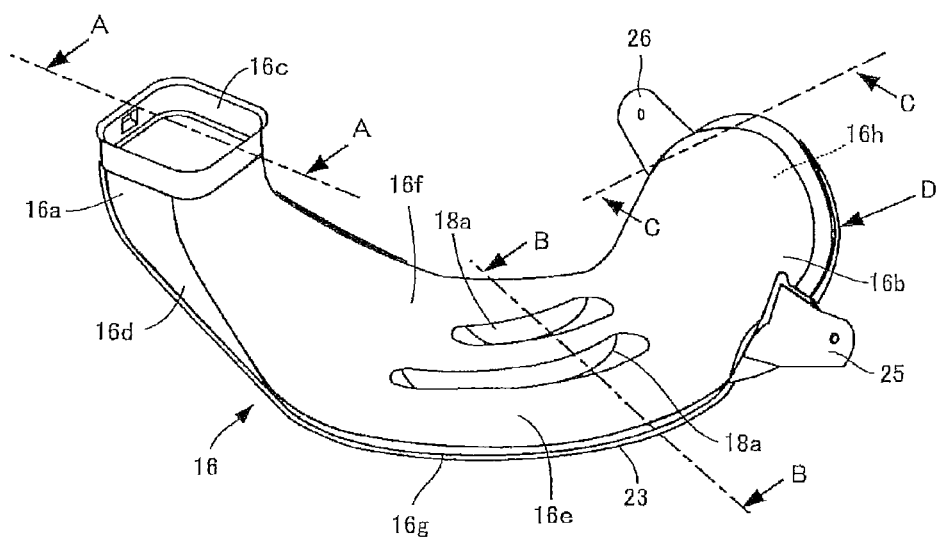
FIG. 2 is a perspective view showing a structure of a duct as an essential part of the invention.
Figure 3:
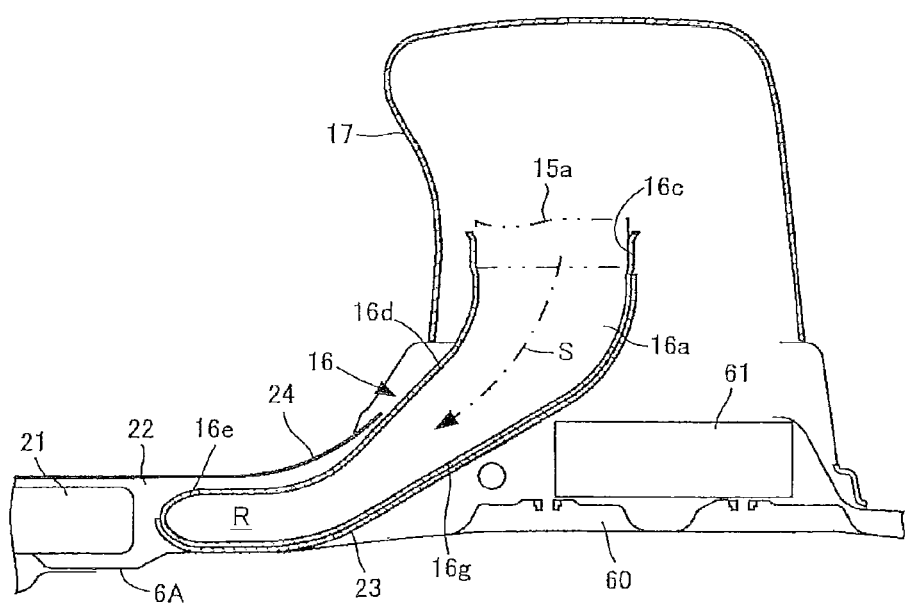
FIG. 3 is a cross sectional view of the duct installed in the electric vehicle, taken along line 2A-A in FIG. 2.

The duct 16 is made of plastics, and is bent by approximately 90 degrees between its front end 16a and rear end 16b. Refer to FIG. 2 and FIG. 3. The duct 16 has its front end 16a connected to the outlet 15a of the air conditioning unit 15. The front end 16a has a rectangular opening 16c, into which the outlet 15a of the air conditioning unit 15 is fitted. The duct 16 has a shoulder 16d between the front end 16a and a center 16e thereof. The shoulder 16d extends downward, and is shaped in accordance with a center console 17 which defines an interior shape of the electric vehicle 1. The duct 16, i.e. between the front and rear ends 16a and 16b, is housed in the center console 17, so that it is invisible from the front passenger's seat 4A.

Referring to FIG. 3, a bottom 16g of the shoulder 16d is lowered to a height where it does not interfere with the a panel 60 and a vehicle component 61 positioned on the floor panel 60.

Figure 4:
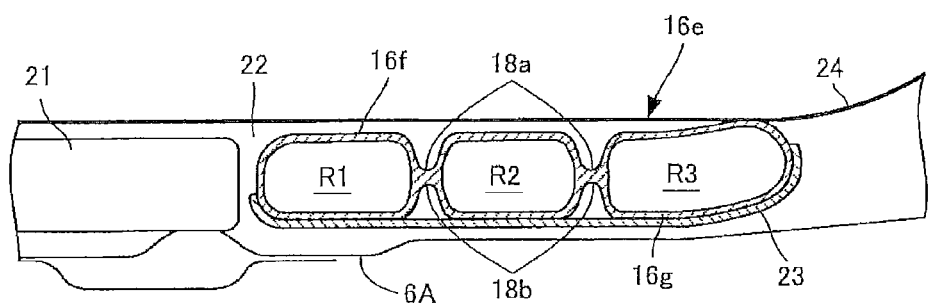
FIG. 4 is a cross sectional view of the duct, taken along line 2B-B in FIG. 2.

A center 16e which is present between the shoulder 16d and the rear end 16b of the duct 16 is substantially horizontal, and is at a lowest position of the duct 16. As shown in FIG. 4, ribs 18a and 18b are present on the center 16e, extend on the duct between an upper part 16f and bottom 16g, and form three airstream flow paths R1 to R3. However, the number of airstream flow paths is not always limited to three. The ribs 18a and 18b are effective in not only tidying airstreams but also reinforcing the center 16e of the duct 16. The center 16e is positioned on the floor 6A at the front passenger's seat.

A floor carpet 24 extends over the floor 6A. A bulk material 21 is placed between the floor 6A and the floor carpet 24, and forms a space 22 between them. The center 16e is present in the space 22, which has a height substantially equal to a thickness of the center 16e. A heat resistant material 23 is attached to the bottom 16g of the duct 16. The airstream flow paths R1 to R3 at the center 16e have a sectional area which is substantially equal to a sectional area of the opening 16c, which is effective in minimizing a pressure loss.

Figure 5:
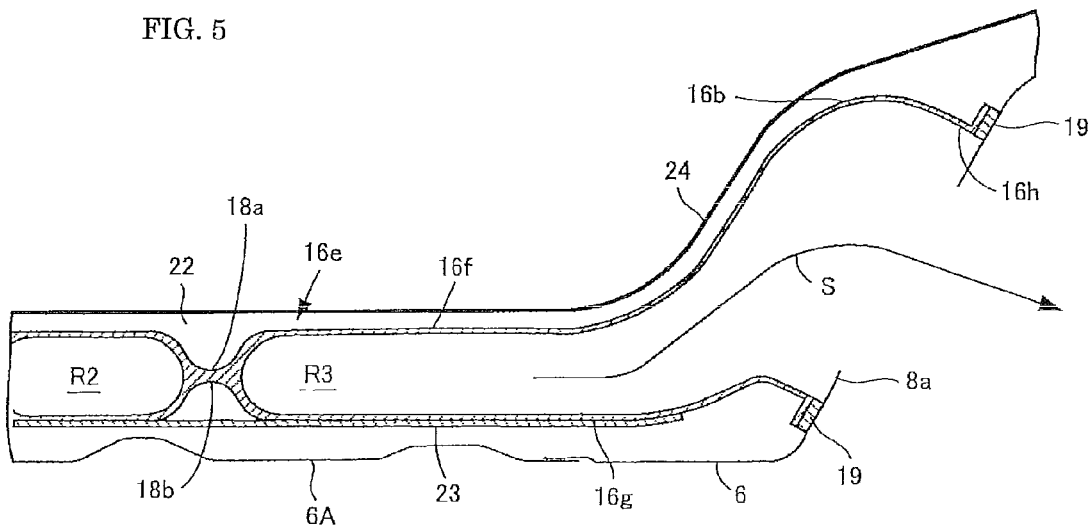
FIG. 5 is a cross sectional view of the duct, taken along line 2C-C in FIG. 2.
Figure 6:
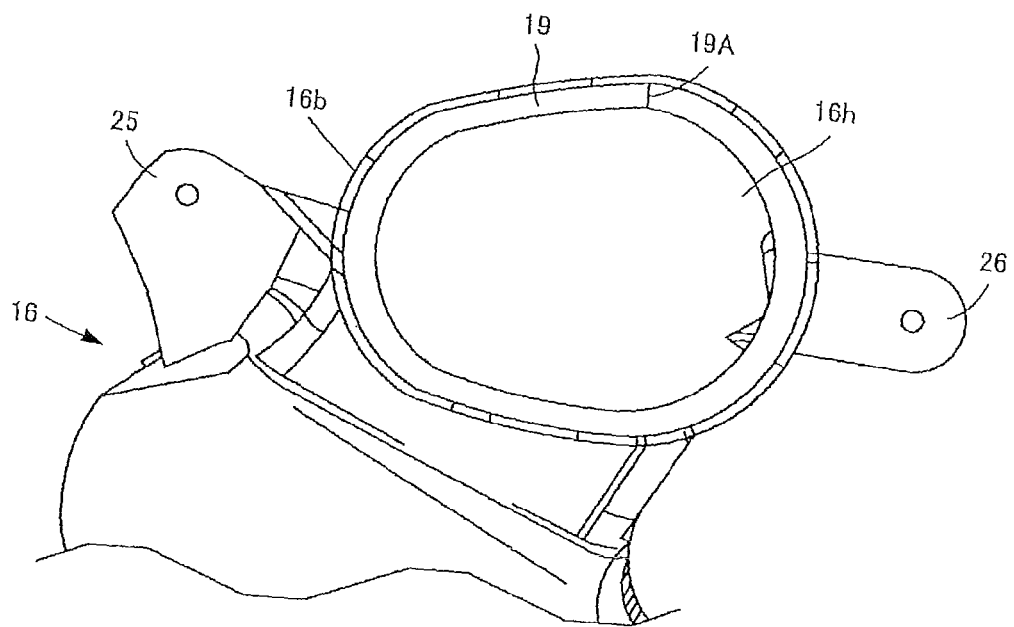
FIG. 6 is a cross sectional view of the duct, observed in a direction D in FIG. 2.

As shown in FIG. 5 and FIG. 6, the rear end 16b of the duct 16 has an opening 16h which communicates with the air inlet 8a of the battery unit container 8. The opening 16h is present at a position which is higher than the position of the center 16e. The center 16e is at the lowest position. An annular rubber packing 19 seals a joint between the opening 16h and the air inlet 8a. The packing 19 is attached around the joint so that a seam 19A is at an upper part of the opening 19h. In FIG. 6, reference numerals 25 and 26 denote parts which are attached to the floor 6 (defining the battery unit container 8), using fasteners (not shown).

The outlet 15a of the air conditioning unit 15 and the air inlet 8a of the battery unit container 8 (housing the battery unit 5) are joined as described above. The duct 15 serving as the air flow path R extends under the floor 6A in accordance with the shape of the vehicle interior at the front passenger's seat A4. Cold airstreams from the air conditioning unit 15 are guided to the battery unit 5 via the airstream flow path R. Therefore, airstreams are guided via the duct 16 which is not exposed in the vehicle interior. Further, the opening 16h at the rear end 16e of the duct 16 is positioned higher than the center 16e which is at the lowest position. This is effective in preventing water, which comes into the duct 16, from flowing into the battery unit container 8, and protecting the battery unit 5.

The ribs 18a and 18b can reinforce the center 16e of the duct 16, so that the duct 16 is slow to be deformed, can reliably guide a necessary amount of cold airstreams, and can remain strong. The center 16e is positioned in the space 22 defined by the floor 6A and the floor carpet 24 which are maintained by the bulk material 21, remains invisible in the vehicle interior, and protects the front seat passenger against dew drops. Further, the space 22 serves as a heat insulator, prevents cold airstreams from being heated by air in the vehicle interior, and maintains a temperature of cold airstreams at an optimum level.

Still further, the duct 16 is positioned under the floor 6A at the front passenger's seat which is not always occupied by a passenger, and minimizes a chance that the driver's space becomes narrow.

INDUSTRIAL APPLICABILITY

The invention is applicable to an electric vehicle, and can cool the power unit without adversely affecting interior comfort in the vehicle, and prevent dew drops or temperature rise while cold airstreams are being guided to the power unit.

What is claimed is:

1. An electric vehicle, comprising:
   a motor;
   a power unit for driving the motor;
   an air conditioning unit; and
   a cooling structure for cooling the power unit of the electric vehicle, the cooling structure including a duct which has a first end joined to the air conditioning unit and a second end joined to the power unit, the duct defining an airstream flow path through which cold airstreams from the air conditioning unit is guided to the power unit, the duct being shaped in accordance with a shape of a vehicle interior near a front passenger side, and provided under the front passenger side,
   wherein the second end has an opening which is positioned higher than a lowest bottom surface of the duct,
   the duct has a plurality of ribs near the floor, the ribs dividing the airstream flow path,
   the duct has a shoulder extending from the first end of an intermediate part thereof, the first end of the duct and the shoulder at the intermediate part thereof are housed in a center console that defines an interior of the electric vehicle, and
   the shoulder is shaped in accordance with a shape of the center console.

2. The electric vehicle defined in claim 1, wherein the duct is housed in a space defined by a bulk material, the floor and a carpet on the floor.

3. The electric vehicle defined in claim 1, wherein the lowest portion of the duct is at an intermediate portion of the duct.

4. The electric vehicle defined in claim 1, wherein an annular rubber packing is attached around the opening for sealing a joint between the opening and an air inlet.

5. A cooling structure for cooling a battery unit of an electric vehicle that drives a motor, comprising:
   a duct having a first end joined to an air conditioning unit and a second end joined to a power unit, the duct defining an airstream flow path through which cold airstreams from the air conditioning unit is guided to the battery unit, the duct being shaped in accordance with a shape of a vehicle interior near a front passenger side, and provided under the front passenger side,
   wherein the second end has an opening which is positioned higher than a lowest portion of the duct,
   the duct has a plurality of ribs near the floor, the ribs dividing the air flow path,
   the duct has a plurality of ribs near the floor, the ribs dividing the airstream flow path,
   the duct has a shoulder extending from the first end of an intermediate part thereof, the first end of the duct and the shoulder at the intermediate part thereof are housed in a center console that defines an interior of the electric vehicle, and
   the shoulder is shaped in accordance with a shape of the center console.

6. The cooling structure defined in claim 5, wherein the lowest portion of the duct is positioned at an intermediate portion of the duct.

7. The cooling structure defined in claim 5, wherein the duct is housed in a space defined by a bulk material, the floor and a carpet on the floor.

8. The cooling system as defined in claim 5, wherein an annular rubber packing is attached around the opening for sealing a joint between the opening and an air inlet.

* * * * *